United States Patent [19]

Reetz

[11] Patent Number: 5,155,146

[45] Date of Patent: Oct. 13, 1992

[54] THERMOPLASTIC COMPOSITE AND METHOD AND APPARATUS OF MAKING THE SAME

[76] Inventor: William R. Reetz, 1829 Roanoke Dr., Boise, Id. 83712

[21] Appl. No.: 677,416

[22] Filed: Mar. 29, 1991

[51] Int. Cl.[5] .................... C08K 7/02; C08K 3/40; C08J 11/04; C08L 1/02

[52] U.S. Cl. .................... 523/222; 524/13; 524/35; 524/494; 524/495; 524/514; 521/47

[58] Field of Search .................. 524/13, 35, 494, 495, 524/514, 847; 521/47; 523/222

[56] References Cited

U.S. PATENT DOCUMENTS

| | | | |
|---|---|---|---|
| 3,023,136 | 2/1962 | Himmelheber | 428/338 |
| 3,025,202 | 3/1962 | Morgan et al. | 264/45.3 |
| 3,257,338 | 6/1966 | Sefton | 521/54 |
| 3,383,228 | 5/1968 | Rekate et al. | 106/624 |
| 3,440,072 | 4/1969 | Daubenspeck et al. | 106/200 |
| 3,483,597 | 12/1969 | Windeler et al. | 425/378.1 |
| 3,503,840 | 3/1970 | Parrish | 428/87 |
| 3,547,840 | 12/1970 | Stastny et al. | 521/55 |
| 3,567,815 | 3/1971 | Frank | 210/604 |
| 3,644,271 | 2/1972 | Tulley | 523/222 |
| 3,708,256 | 1/1973 | Kopp | 425/376.1 |
| 3,718,536 | 2/1973 | Downs et al. | 523/344 |
| 3,734,985 | 5/1973 | Greenberg | 264/45.3 |
| 3,790,421 | 2/1974 | Hobgood, Jr. | 156/242 |
| 3,846,265 | 11/1974 | Yamaguchi et al. | 522/89 |
| 3,876,744 | 4/1975 | Onder | 264/105 |
| 3,914,359 | 10/1975 | Bevan | 264/45.3 |
| 3,958,069 | 5/1976 | Gaylord | 428/407 |
| 3,983,295 | 9/1976 | Murer et al. | 428/318.8 |
| 3,995,980 | 12/1976 | Smith | 425/131.1 |
| 4,011,183 | 3/1977 | Ruff | 523/219 |
| 4,014,826 | 3/1977 | Yunan | 521/54 |
| 4,031,179 | 6/1977 | Tatzel et al. | 264/517 |
| 4,085,247 | 4/1978 | Godfried | 428/290 |
| 4,101,050 | 7/1978 | Buckler et al. | 229/3.5 R |
| 4,115,509 | 9/1978 | Kendall-Smith et al. | 264/331.11 |
| 4,182,641 | 1/1980 | Fitts | 156/77 |
| 4,229,398 | 10/1980 | Harvey | 264/113 |
| 4,316,934 | 2/1982 | Maier et al. | 428/308.4 |
| 4,322,260 | 3/1982 | Conlon | 156/244.12 |

(List continued on next page.)

FOREIGN PATENT DOCUMENTS

| | | | |
|---|---|---|---|
| 0045216 | 2/1982 | European Pat. Off. | 524/35 |
| 1281679 | 10/1968 | Fed. Rep. of Germany | 264/140 |
| 1496935 | 10/1966 | France | 264/DIG. 7 |
| 3713334 | 9/1962 | Japan | 264/DIG. 7 |
| 3823786 | 11/1963 | Japan | 264/DIG. 7 |
| 453233 | 2/1970 | Japan | 264/DIG. 7 |
| 5000757 | 1/1975 | Japan | 264/DIG. 7 |
| 5029841 | 9/1975 | Japan | 264/DIG. 7 |
| 5239566 | 10/1977 | Japan | 264/DIG. 7 |
| 288293 | 1/1971 | U.S.S.R. | 264/DIG. 7 |
| 1090741 | 11/1967 | United Kingdom | 264/DIG. 7 |
| 1502777 | 3/1978 | United Kingdom | 264/DIG. 7 |

OTHER PUBLICATIONS

H. E. Alford and F. Veatch, "Glass Microballoon Particles, a Low-Density Filler", *Modern Plastics*, Nov., 1961.

*Primary Examiner*—Paul R. Michl
*Assistant Examiner*—Peter Szekely
*Attorney, Agent, or Firm*—Kolisch, Hartwell, Dickinson, McCormack & Heuser

[57] ABSTRACT

An ambient temperature, dry blend for forming a thermoplastic composite is disclosed including a quantity of expanded thermoplastic pieces and a quantity of filler particles suspended by the pieces, with the quantity being up to 60% by weight of the blend. Also disclosed is a method of making a thermoplastic composite including dry mixing at ambient temperature a quantity of filler particles with a quantity of expanded thermoplastic pieces to form a blend. The method also includes forming the blend into a thermoplastic composite. Also disclosed is a thermoplastic composite formed by compressing heated compressing and dispensing an ambient temperature blend of thermoplastic pieces and filler particles. Finally, apparatus is disclosed for making a reinforced thermoplastic composite from a dry blend of expanded thermoplastic pieces and filler particles.

17 Claims, 3 Drawing Sheets

U.S. PATENT DOCUMENTS

| | | | |
|---|---|---|---|
| 4,358,418 | 11/1982 | Heggenstaller | 264/108 |
| 4,361,613 | 11/1982 | Bogner et al. | 428/119 |
| 4,413,969 | 11/1983 | McDonald | 425/217 |
| 4,517,308 | 5/1985 | Ehlenz et al. | 502/401 |
| 4,521,477 | 6/1985 | Kiss | 428/282 |
| 4,537,823 | 8/1985 | Tsang et al. | 428/308.4 |
| 4,555,439 | 11/1985 | Ueeda et al. | 428/221 |
| 4,596,738 | 4/1986 | Metcalfe et al. | 428/308.4 |
| 4,603,078 | 7/1986 | Zanker et al. | 428/317.9 |
| 4,623,150 | 11/1986 | Moehlman et al. | 273/362 |
| 4,643,940 | 2/1987 | Shaw et al. | 428/308.4 |
| 4,649,034 | 3/1987 | Gramelspacher | 423/244 |
| 4,822,694 | 4/1989 | Randin et al. | 428/615 |
| 4,859,352 | 8/1990 | Steinau et al. | 252/41 |

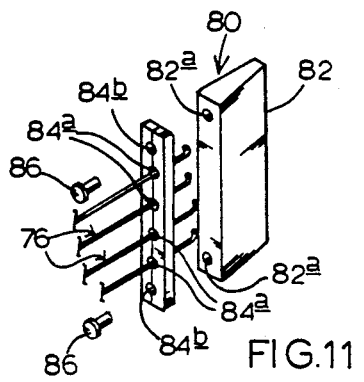
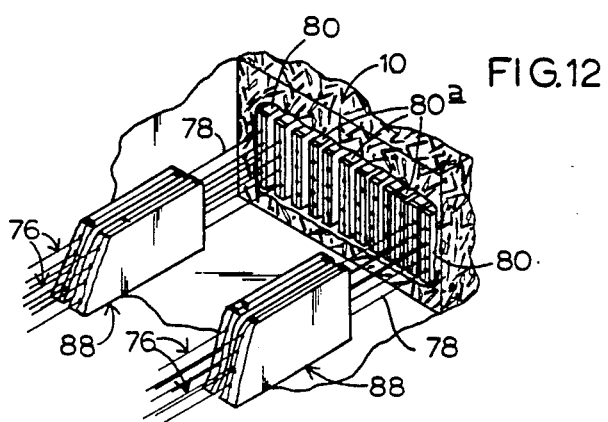
FIG.11  FIG.12
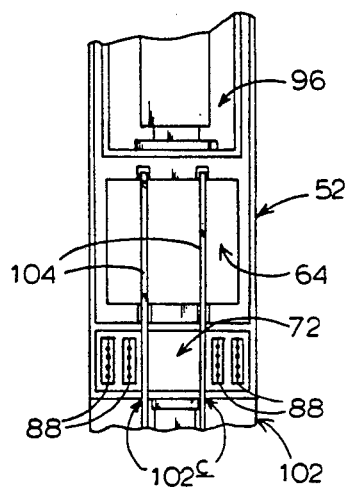
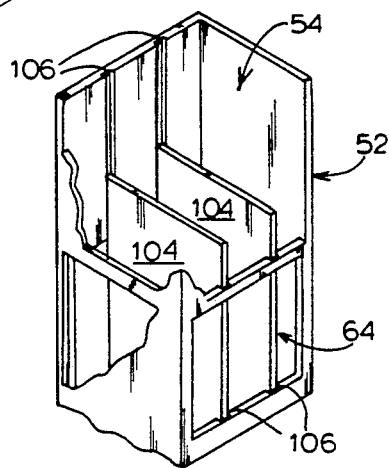
FIG.13  FIG.14
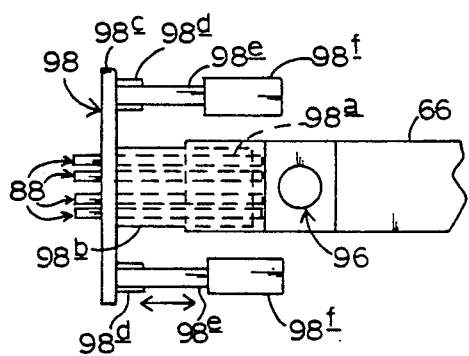
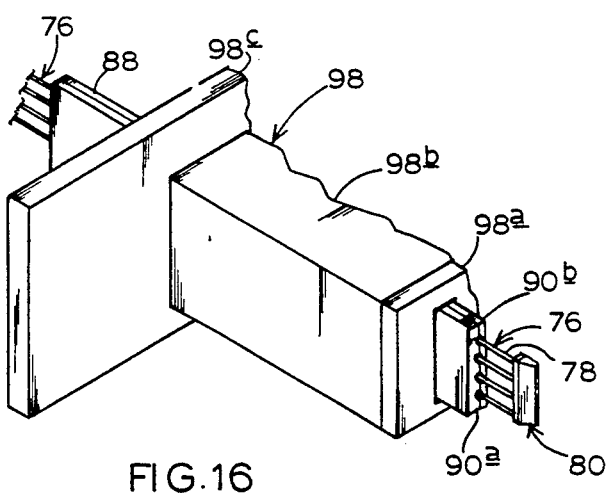
FIG.15  FIG.16

THERMOPLASTIC COMPOSITE AND METHOD AND APPARATUS OF MAKING THE SAME

BACKGROUND OF THE INVENTION

The present invention relates to thermoplastic composites and methods of making the same, and more particularly to a composite formed by a novel method that can be carried out at ambient temperature.

Conventional methods of making thermoplastic composites are expensive and limited compared to those for making thermoset composites. The key reason for such a distinction is the relatively high viscosities associated with thermoplastics which makes it difficult to obtain the necessary wetting of the filler to produce a uniform, cohesive end product.

However, various applications for composites make it desirable and necessary to utilize thermoplastic composites as opposed to thermoset composites. One reason is that thermoplastic composites are desirable because thermoplastics are generally less expensive than thermoset polymers. In addition, the desired properties of a composite may require using thermoplastic polymers instead of thermoset polymers.

Presently, there are at least two known methods of mixing thermoplastic polymers with powdered fillers. In one method, solid thermoplastic pellets and powdered filler are pre-mixed and then passed through a heated extruder where the pellets are melted, the pellets and filler are mixed by mechanical means and ejected from the extruder. In another application, heat and extremely high pressure are used to force the mixture of thermoplastic pellets and powdered filler through a die and into a mold.

To mix thermoplastic polymers with non-powdered fillers, there are at least three conventional methods. In one method, filler particles are individually dipped in a hot viscous bath of thermoplastic, and then after cooling, the dip-coated filler particles are woven into a fabric-like form. Next, such fabric-like material is positioned in a mold with additional thermoplastic material. Heat is then applied causing the thermoplastic to melt into and around areas of the fabric-like material to fill in dry spots where the dip-coating step may not have sufficiently worked.

An alternative method is to use extremely high pressure injection of thermoplastic material into a mold to coat certain types of fillers. Only certain types of fillers are usable for such an application.

In addition, it is known to make relatively thin sections of composite material by layering thermoplastic pellets and filler material in a mold followed by heating the mold.

It is therefore an object of the present invention to provide a blend for forming a thermoplastic composite that does not require using conventional, expensive techniques for achieving proper wetting between the thermoplastic and filler material.

Another object of the invention is to provide a method of making a thermoplastic composite that does not require a heating/mixing step after forming a blend of thermoplastic pieces and filler particles.

A still further object of the present invention is to provide a thermoplastic composite that is a solid, homogenous, non-foamed material that can be easily and relatively inexpensively produced.

Yet another object of the present invention is to provide apparatus for making a reinforced thermoplastic composite from the blend of thermoplastic pieces and filler particles.

SUMMARY OF THE INVENTION

The present invention achieves the above objects by providing an ambient temperature, dry blend for forming a thermoplastic composite that includes a quantity of expanded thermoplastic pieces and a quantity of filler particles suspended by the pieces. The filler particles form up to 60% by weight of the blend. The invention also embodies a method of making a thermoplastic composite that includes dry mixing at ambient temperature a quantity of first filler particles with a quantity of expanded thermoplastic pieces to form a blend. The method also includes the step of forming the blend into a thermoplastic composite.

The present invention also embodies a thermoplastic composite formed by compressing, heating and dispensing an ambient temperature blend of expanded thermoplastic pieces and filler particles.

The present invention also embodies apparatus for making a reinforced thermoplastic composite from the above-identified dry blend. The apparatus includes a first elongate compartment defining a low-pressure compression chamber, and a feeder for sequentially transferring the blend to the first compartment in preselected amounts. Also included is a second elongate compartment defining a high-pressure compression chamber with open ends and an entry section structured with a port. The second compartment is positioned adjacent the first compartment so that the chambers are in communication with each other via the port. The apparatus includes a plurality of reinforcing strands to be fed through the high-pressure chamber, with each such strand having a front section which is positioned in the entry section.

The apparatus of the invention also includes means for heating the high-pressure chamber, and a low-pressure compressor to compress the blend in the low-pressure chamber and transfer it to the entry section around the front sections of the strands. A high-pressure compressor is included to compress the blend around the strands in the heated high-pressure chamber to form a molten reinforced thermoplastic composite, and for transferring the molten composite out of the chamber where it can cool, thus to form a reinforced thermoplastic composite.

These and additional objects and advantages of the present invention will be more readily understood after a consideration of the drawings and the detailed description of the preferred embodiment.

BRIEF DESCRIPTION OF THE DRAWINGS

FIG. 11 is a perspective view of a tensioning member usable in the apparatus of FIG. 7.

FIG. 12 is like FIG. 10 only that a somewhat larger portion of the high-compression chamber is shown with tensioning members and guide structures of the apparatus of the invention disposed therein.

FIG. 13 is a front sectional view of the apparatus of the invention showing the reciprocable inserter in the first position with partitions inserted through portions of both compression chambers.

FIG. 14 is a portion of the first compartment shown in FIG. 13, being viewed from a different angle, and with sections broken away to show detail.

FIG. 15 is a top fragmentary view of the apparatus shown in FIG. 7.

FIG. 16 is a perspective view of a portion of the apparatus shown in FIG. 15 with the addition of certain other elements of the invention.

DETAILED DESCRIPTION OF THE PREFERRED EMBODIMENT

Figure 1A:
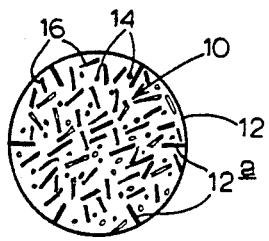
FIG. 1A is a side sectional view of the dry blend of the present invention disposed is a mixing vessel.

Turning now to the drawings, FIG. 1A shows ambient temperature, dry blend 10 of the present invention disposed in a mixing vessel 12 with plural tumbling vanes 12a. Blend 10 is made of a quantity of expanded thermoplastic pieces 14 and a quantity of filler particles 16 suspended by the pieces. As shown in the drawings, pieces 14 and particles 16 are enlarged to aid the reader in understanding the invention. Those skilled in the art will appreciate that in a true-to-scale drawing of blend 10 both the pieces and particles would be smaller, and the blend would look denser. Blend 10 may include pieces 14 and particles 16, and in addition, a quantity of unexpanded thermoplastic pieces (undepicted).

The blend is formed by dry mixing pieces 14 and particles 16 in vessel 12 for a sufficient period of time so that the particles are suspended by the pieces. The relatively lightweight expanded thermoplastic pieces are surprisingly effective at suspending the relatively heavy filler particles.

Preferably, the pieces are made from waste expanded thermoplastic such as EPS (expanded polystyrene). Waste EPS can be broken into pieces by feeding it through conventional shredding devices such as a paper shredder.

The filler particles are preferably chosen from the group consisting of wood chips, cellulose, carbon, the material sold under the trademark KEVLAR® (Polyaramid Material), or glass fibers. However, any desired filler particle known to those skilled in the art may be used. As will be understood shortly, woven fabric filler sections may also be used as filler particles in dry blend 10.

Figure 6:
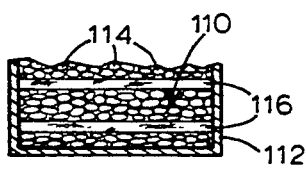
FIG. 6 is a fragmentary, side sectional view of a second embodiment of the dry blend of the present invention shown in FIG. 1.

The dry mixing operation can be performed by rotating, oscillating, tumbling, or shaking vessel 12. Turning ahead for a moment to FIG. 6, a second embodiment of the dry blend is shown at 110 and is dry mixed by layering woven fabric filler sections 116a and pieces 114.

Referring now to FIGS. 1B–3, dry blend 10 is shown with processing equipment for practicing the method of the present invention. It should be understood that suitable support structure (undepicted) is used for the equipment shown in the remaining drawings. The equipment includes a hopper 18 positioned over an entry port 20 of a chamber 22. Referring to the right of FIG. 1B, an extruder die 23 is attached to the downstream end of chamber 22. Dry blend 10 is placed or dispensed into the chamber from the hopper via the entry port.

Figure 3:
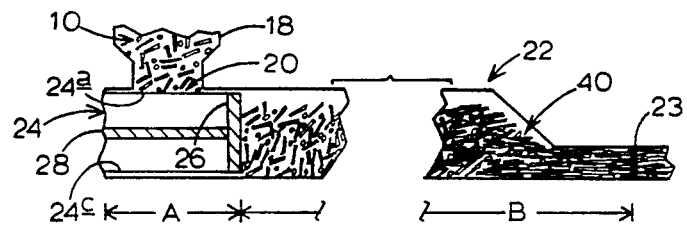
FIG. 3 is like FIG. 1B except that another step of the method of the present invention is shown.

Bidirectionally extendable across the inside of the chamber is a ram 24 that includes a ram plate 26 and side walls 24a–d. Suitably fastened to the back surface of ram plate 26 is a push rod 28. Rod 28 is attached to a conventional hydraulic power device (undepicted) so that ram 24 can be moved through chamber 22 as shown in FIG. 3.

Still referring to FIGS. 1B–3, sides 24a–d of ram 24 are slidable along inside surfaces of chamber 22. Side 24d prevents further dispensing of blend 10 during soon to be described compressing and heated compressing steps of the method of the present invention. As will be further explained, the portion of chamber 22 above the bracketed section designated as A is the place where the compressing step of the present invention begins. The portion of chamber 22 above the bracketed area designated as B is where the soon to be described heated compressing step takes place.

Figure 4:
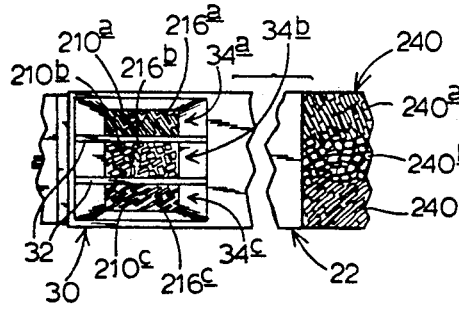
FIG. 4 is a fragmentary, top view of apparatus like that shown in FIG. 3 except that a portion of it has been modified to practice another step of the present invention.

Referring to FIG. 4, chamber 22 is shown with a modified top hopper 30 mounted over entry port 20. Hopper 30 includes partitions 32 which divide the hopper into sections 34a–c. The partitioned hopper is used to practice a soon to be described step of the method of the present invention that results in the formation of a zoned thermoplastic composite.

Figure 5:
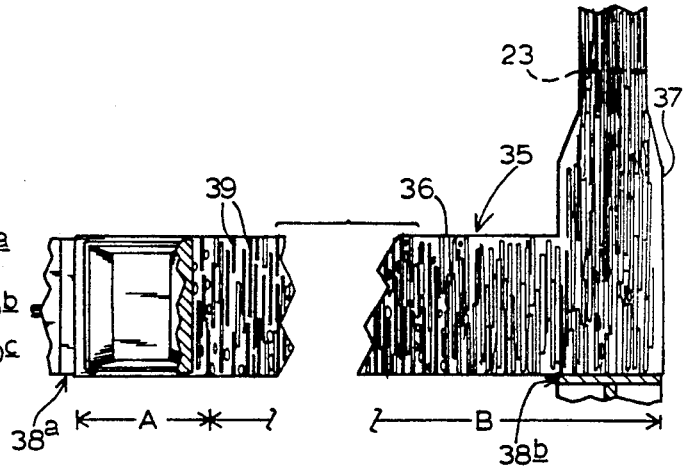
FIG. 5 is a top view of equipment similar to that shown in FIG. 3 with portions broken away to show modifications for processing certain types of filler particles.

Referring to FIG. 5, certain modified equipment for practicing the method of the present invention is disclosed. A modified chamber 35 is shown which includes a first chamber section 36 and a second chamber section 37. Rams 38a,38b are bidirectionally extendable through chamber sections 36,37, respectively. Chamber 30 is designed for processing a type of dry blend that includes expanded thermoplastic pieces 14 and rod-shaped filler particles 39. The details of this processing will be described below.

Figure 7:
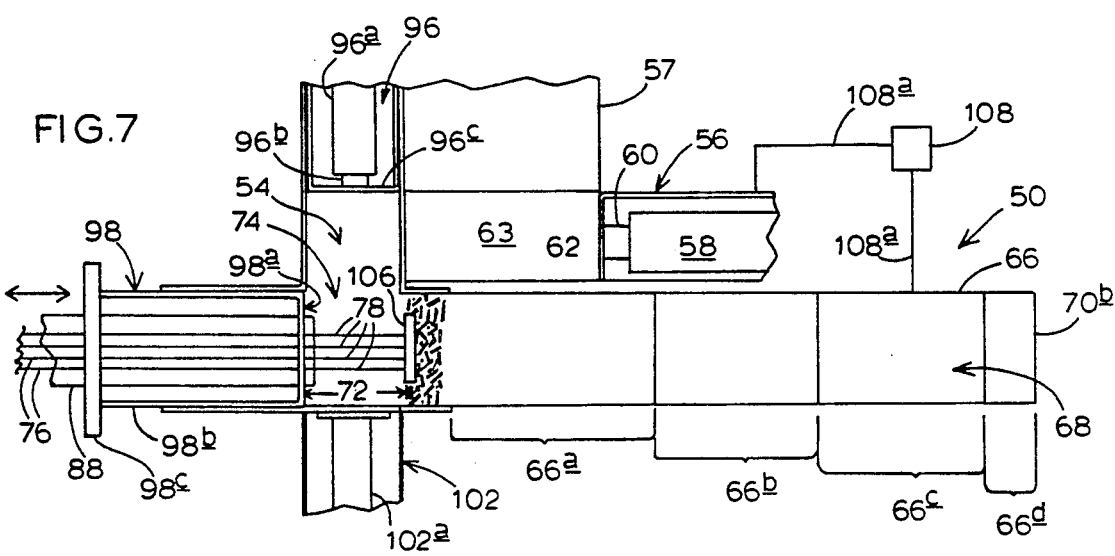
FIG. 7 is a side sectional view showing the preferred embodiment of the apparatus of the present invention.

FIGS. 7–16 show the apparatus of the present invention. In FIG. 7, the apparatus is shown generally at 50. Apparatus 50 is for making a reinforced thermoplastic composite from a dry blend of expanded thermoplastic pieces and filler particles as described above. As will be shown below, apparatus 50 is for adding a reinforced feature to a thermoplastic composite like that described above.

Still referring to FIG. 7, apparatus 50 includes a first elongate compartment 52 defining a low-pressure compression chamber 54. Adjacent first compartment 52 is a feeder 56 for sequentially transferring dry blend 10 (FIG. 1) to the first compartment in preselected amounts. A hopper 57 may be suitably positioned above feeder 56 to deliver the preselected amount of the dry blend to the feeder for sequential transferring. Preselected amounts may be dispensed from the hopper using what is known as a slider plate (undepicted) that may be fitted adjacent a port (undepicted) of the hopper to control the amount of material being dispensed.

Feeder 56 may be structured as shown with a hydraulic cylinder 58 suitably mounted on support structure (undepicted) and a push rod 60 which is bidirectionally extendable out of the cylinder to move feeder structure 62 in a feeder channel 63 in the directions shown by the arrows.

Referring for a moment to FIGS. 7, 13 and 14, feeder 56 moves material into low-pressure chamber 54 via a suitable feeder port 64 formed in first compartment 52.

Referring to FIG. 7, apparatus 50 also includes a second elongate compartment 66 which defines a high-pressure compression chamber 68 with open ends 70a, 70b. Second compartment 66 also includes an entry section 72 structured with a port 74 which allows both chambers 54, 68 to communicate with each other. For reasons to be described below, compartment 66 may be thought of in terms of subsections 66a–d.

Figure 8:
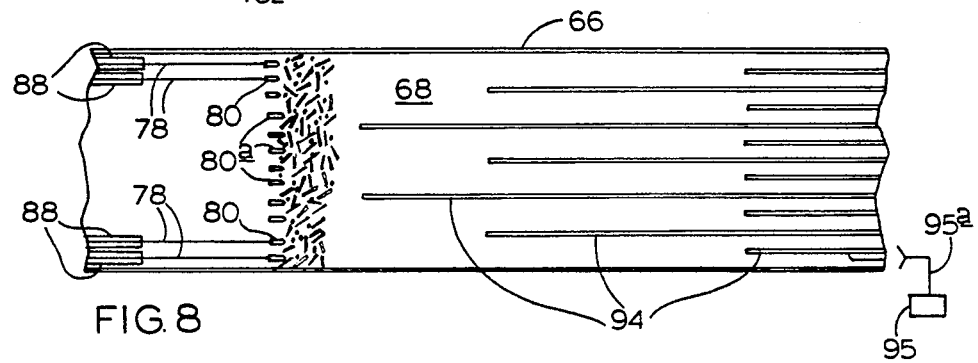
FIG. 8 is a top fragmentary enlarged view of the apparatus of FIG. 7 with certain elements omitted to show the inside of the high-compression chamber.

Referring to FIGS. 7 and 8, apparatus 50 includes a plurality of reinforcing strands 76 that are to be fed through high-pressure chamber 68. Strands 76 may be fed from any suitable strand-dispensing mechanism such as what is known in the art as strand, or fiber creels. As known to those skilled in the art, such creels are designed to provide a tensioned release of strands.

Each of strands 76 have corresponding front sections 78 which are positioned in entry section 72 during an operation step that will be described below.

Referring to FIGS. 8, 11 and 16 apparatus 50 also includes a plurality of tensioning members 80 which may be removably attached to front section 78 of desired strands 76. Referring to FIG. 11, tensioning member 80 may be in the form of a wedge, including a wedge submember 82 and a bar 84 with suitable holes 84a formed therein. Bar 84 also has a pair of holes 84b that are alignable with threaded bores of 82a of submember 82, both for receiving bolts 86.

Referring to FIGS. 7, 8, 12 and 16, apparatus 50 also includes protective guide structure 88. Guide structure 88 may be formed of sections 90a, 90b that have grooves formed in them so that when the two sections are fastened together using suitable fasteners (undepicted), holes are formed through which strands 76 may be fed to extend through the structure.

Referring to FIG. 8, apparatus 50 includes means 92 for heating high-pressure chamber 68. Chamber 68 may take the form of any of the above-described heating means. As shown in FIG. 8, the heating means may take the form of a plurality of novel heat vanes 94 which are suitably positioned to extend from the top to the bottom of high-pressure chamber 68 and to define paths of varying widths. As will be described in connection with the operation of apparatus 50, positioning vanes 94 as in FIG. 8 allows the blend to be pushed between them and through the chamber.

Still referring to FIG. 8, the vanes may be made out of any suitable metal and must be operatively connected to a suitable heater 95 via a conductor 95a. Only one vane 94 is shown connected to heater 95, but those skilled in the art will appreciate that all vanes 94 should be connected to a suitable heater, or heaters.

Referring to FIG. 7 and 8, the vanes are positioned to define relatively wide paths in subsection 66a, and progressively narrower paths in subsections 66b–66c. No vane are positioned in subsection 66d, which is of conventional design and may be angled inwardly to aid in compressing the to-be-described molten reinforced thermoplastic composite when the same is pushed therethrough.

Figure 9:
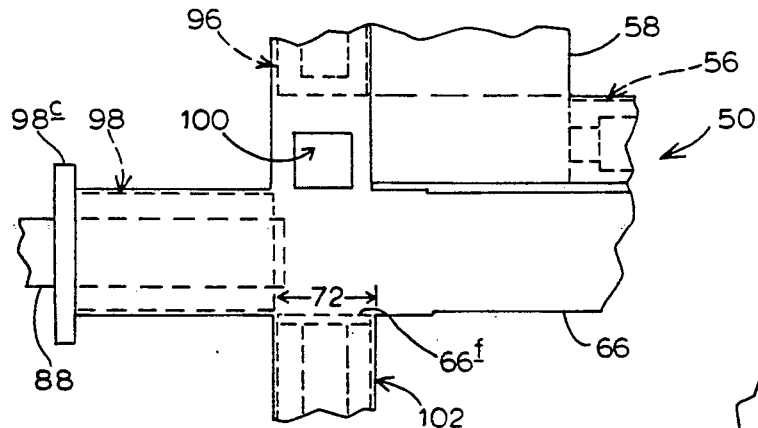
FIG. 9 is a fragmentary side view of the apparatus shown in FIG. 7.

Referring to FIGS. 7 and 9, apparatus 50 includes a low-pressure compressor 96 and a high-pressure compressor 98. Low-pressure compressor 96 includes a hydraulic cylinder 96a, a push rod 96b, and a compressor plate member 96c.

Referring to FIGS. 7, 9 and 16, high-pressure compressor 98 includes a ram plate 98a with a slot 98a₁ formed therein. Referring to FIG. 16, slot 98a₁ allows guide structure 88 to extend therethrough. Additional slots may be formed in ram plate 98a depending on the desired number of guide structures 88 being used. High-pressure compressor 98 also includes hollow box structure 98b and support plate 98c with a hole formed therein for receiving box structure 98b.

Referring to FIG. 15, plate 98c is connected by suitable fasteners 98d to push rods 98e that are bidirectionally extendable from hydraulic cylinders 98f.

Both compressors are structured to move bidirectionally in compression strokes. The compression stroke for low-pressure compressor 96 would be from its retracted position shown in FIG. 7 to an extended position (undepicted) adjacent port 74 of second compartment 76. High-pressure compressor 98 is movable bidirectionally from a retracted position shown in FIGS. 7 and 9 to an extended position (undepicted) adjacent the left side of dry blend 10 shown in FIG. 7.

Both compressors 96, 98 also perform a transferring function. That is, low-pressure compressor 96 transfers the blend to entry section 72. High-pressure compressor transfers the low-pressure compressed blend to approximately the position of dry blend 10 in FIG. 7. By sequentially adding additional pre-selected amounts of dry blend and performing the low-pressure and high-pressure compressing operations, the compressed blend will be pushed through chamber 66 in the paths defined by heat vanes 94 so that a molten, reinforced thermoplastic composite is formed.

By performing further compressing operations, the molten thermoplastic composite will be pushed out of chamber 66 through opening 70b where it can be cooled and further processed using conventional rollers and the like to form a reinforced thermoplastic composite. Designing high-pressure compressor so that it will extend only to approximately the position of dry blend 10 in FIG. 7 is advantageous because the blend is not yet heated at that point. Thus, ram plate 98a will not become gummed up by molten thermoplastic composite.

Referring to FIG. 9, first compartment 52 is formed with an access port 100 allowing accessibility to front sections 78.

Finally, referring to FIGS. 7, 9, 13 and 14, second compartment 66 may be formed with an opening 66e to allow a reciprocable inserter 102 to place partitions 104 therethrough, and into entry section 72 and extending into low-pressure chamber 54. Reciprocable inserter 102 includes a push rod 102a with a support plate 102b having slots 102c formed therein (FIG. 13) for allowing fixed attachment thereto of partitions 104.

Referring to FIGS. 13–14, reciprocable inserter 102 is actuable to a first position with partitions 104 inserted through entry section 72 and into low-pressure chamber 54. The partitions may be guided through the entry section and low-pressure chamber by forming suitable slots 106 in first compartment 52.

Reciprocable inserter 102 is designed so that, under the force of low-pressure compressor 96 it will retract downwardly allowing compressor 96 to transfer an amount of dry blend to entry section 72. In other words inserter 102 will retract to second position where paritions 104 will extend upwardly only as far as entry section 72. Finally, inserter 102 is actuable downwardly to a third position where the parititions are completely removed from entry section 72 so that they will not block high-compressor 98 when it is actuated to compress dry blend 10 as described in connection with FIG. 7.

Operation

Referring to FIG. 1, ambient temperature, dry blend 10 of the present invention is made by selecting quantities of pieces 14 and filler particles 16, and dry mixing them in a rotatble, oscillatible, or shakable mixing vessel or drum 12. To obtain a cohesive thermoplastic composite from dry blend 10, filler particles 16 may form up to 60% by weight of the blend.

Referring to FIG. 6, dry mixing may be performed in vessel 112 by successively layering woven fabric filler sections 116a between pieces 114. To practice the below-identified method of the present invention, known processing equipment including a vertical chamber could be used such as that disclosed in U.S. Pat. No. 3,483,597 to Windeler et. al, which is incorporated herein by reference. The vertical chamber is preferred with such a layered blend to ensure that the layers will remain in place during processing to form a thermoplastic composite the cross section of which is characterized by a series of such layers. Of course, the corresponding layers in the formed thermoplastic composite will be compressed greatly relative to that shown in FIG. 7 due to the below-described method.

Figure 1B:
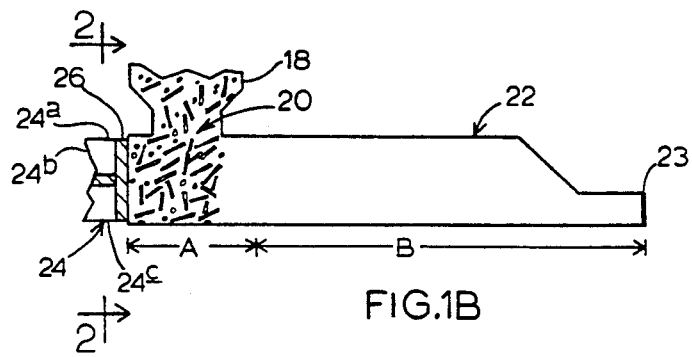
FIG. 1B is a side sectional view showing equipment for practicing the method of the present invention.
Figure 2:
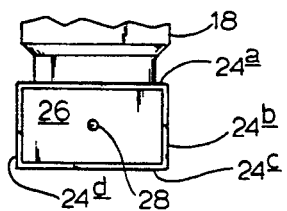
FIG. 2 is a front sectional view of FIG. 1B through line 2—2.

Referring to FIGS. 1B-3, the preferred method of the present invention is practiced by selecting and dry mixing at ambient temperature pieces 14 and filler particles 16 as described above to form a blend 10. Next, blend 10 is formed into a thermoplastic composite. The forming step includes placing a desired amount of the blend into chamber 22 as shown in FIG. 1B. Once the amount of blend 10 is in place, ram 24 is directed under the control of a suitable hydraulic power device (undepicted) to move through the chamber as shown in FIGS. 1B and 3. As ram 24 moves blend 10 through the chamber, a compressing step is performed in compression zone A and a heated compressing step is performed in heated compression zone B.

Referring to the right of FIG. 3, the blend becomes a molten thermoplastic composite 40 in zone B. The method of the present invention includes retracting the ram and repeating the placing, compressing, and heated compressing steps.

Upon exiting the chamber through extruder die 23, composite 40 can be cooled and further processed into a desired shape using conventional means. Those skilled in the art known that composite 72 may be formed in any number of desired shapes by using a suitable extruder die, and further by using heated roll forms (undepicted) if it is desirable to form sheets of the composite.

To perform the heated compressing step, those skilled in the art know to use conventional heaters such as strip or platen heaters which may be attached to the outside of chamber 22. Other known conventional heaters include rod heaters (suitably positioned in chamber 22) or steam/hot-oil heaters (suitably positioned outside chamber 22).

The method of the present invention provides for formation of thermoplastic composite material with corresponding filler particles having an outer dimension of greater than ⅛ inch across. Before now such a composite has not been obtainable because conventional pre-mixes of thermoplastic and filler particles require additional mechanical mixing in a heated environment (so-called wet mixing) to properly blend pieces and filler particles to produce a cohesive composite. A corresponding limitation of such conventional processes is that the extruders which perform the mechanical mixing/heating function are not operable with filler particles having an outer dimension of greater than ⅛ inch across.

As an example of the method of the present invention allowing for use of relatively large filler particles, FIG. 5 shows that rod-shaped filler particles 39 may be processed through chamber 35 using rams 38a, 38b. Filler particles 39 may be ¼ inch in diameter and 12 inches long.

The method of the present invention also includes repeating the above-described selecting and dry-mixing steps for respective quantities of second filler particles and pieces. For example, referring to FIGS. 1 and 4, the dry mixing step could be performed to make three different blends 210a-c by first mixing pieces 14 and filler particles 216a, then mixing the pieces and filler particles 216b, and then mixing the pieces and filler particles 216c. Each of blends 210a-c could be placed in chamber 22 from respective sections 34a-c of hopper 30. After practicing the above-described method, a zoned thermoplastic composite 240 is formed. Composite 140 will have different properties in each of zones 240a-c depending on the choice of pieces and filler particles used to form each zone.

Those skilled in the art know that certain thermoplastics may be chosen for superior compressive strength, wear resistance, etc. Likewise, those skilled in the art know that filler particles may be chosen to vary physical properties. In addition, the choice of thermoplastic or filler for a given zone may be varied due to the cost of raw materials.

Also, combinations of expanded and unexpanded thermoplastics may be used in blend 10, such as EPS and high density polyethylene (HDPE), as long as the blend is at least 40% by weight expanded thermoplastic. Blend 10 may also include combinations of different types of expanded thermoplastics.

Referring to FIGS. 7-16, the preferred embodiment of apparatus 50 of the present invention is operated as follows. At the outset, it should be understood that various moving elements of apparatus 50 are actuated using suitable control circuitry (shown schematically in FIG. 7 by box 108) that is operatively connected to the apparatus via conductors 108a. A preselected amount of a dry blend is dispensed from hopper 57 similar to that shown in FIG. 1B where dry blend 10 is dispensed from hopper 18. The dispensed dry blend is then transferred by feeder 56 via feeder channel 63 to first compartment 52 where low-pressure compressor 96 is actuated to extend downwardly into entry section 72. For the first sequential transfer of dry blend to entry section 72, strands 76 and tensioning members 80 are not positioned in entry section 72. Rather, high-pressure compressor 98 is actuated to perform a compression stroke which causes the dry blend to be compressed in an area downstream of entry section 72 as shown in FIG. 7.

Figure 10:
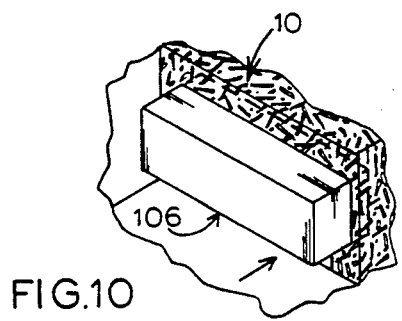
FIG. 10 is a fragmentary perspective view of a portion of the inside of the high-compression chamber.

Next, referring to FIG. 10, a suitable bar 106 is placed in front of high-pressure compressor 98 via access port 100 and compressor 98 is again actuated to make a compression stroke causing bar 106 to be pushed into compressed dry blend 10 as shown in FIG. 10.

Next, bar 106 is removed and, referring to FIG. 12, tensioning members 80 are attached to desired groups of strands 76 and then the tensioning members are inserted into the first amount of dry blend to maintain tension on the strands during subsequent sequences of feeding, low-pressure compressing and high-pressure compressing preselected amounts of dry blend. As shown in FIG. 12, a series of dummy tensioning members 80a are positioned in the recess in compressed dry blend 10 (FIG. 10) to ensure that the tensioning members with strands maintain a proper orientation.

The feeding and compressing steps are now repeated, and for each of these subsequent steps low-pressure compressor 96 will loosely compress amounts of the dry blend downwardly into entry section 72 and around strands 76 which now extend into the entry section. Members 80, 80a will be embedded in a front portion of the molten composite that eventually exits the high-compression chamber. The members can be cut from the molten composite before or after cooling, and then reused for subsequent production runs.

High-pressure compressor 98 will move bidirectionally to compress each amount of dry blend transferred by low-pressure compressor 96. As it moves, guide structure or structures 88 will remain stationary. As shown in FIG. 7, structure 88 may extend slightly into entry section 72, but should at a minimum extend substantially through box structure 98b.

Still referring to FIGS. 7-16, if it is desired to use apparatus 50 to form a zoned reinforced thermoplastic composite such as the zoned thermoplastic composites described in connection with FIG. 4, two suitable partitions would have to be formed in hopper 56 like partitions 32 of modified hopper 30 (FIG. 4). Also, two partitions (undepicted) would have to be positioned in feeder channel 63 so that they are aligned with the partitions in the hopper. Feeder structure 62 would have to be structured with suitable slots to allow it to move bidirectionally with respect to the partitions in channel 63, thus to transfer dispensed amounts of the blend to first compartment 52 as described above.

Next, reciprocable inserter 102 is extended to its first position with partitions 104 inserted through entry section 72 and low-pressure chamber 54 (FIG. 13). At this point zoned blends of material could be fed from feeder 56 into first compartment 52 through feeder port 64 (FIG. 14) where each blend would remain in corresponding zones via partitions 104. Next, low-pressure compressor 96 would be actuated to perform a compression stroke where it moves downwardly causing partitions 104 and inserter 102 to retract downwardly to a position where partitions 104 extend into entry section 72 only. Then inserter 102 would be actuated to move downwardly to the third position with the partitions out of entry section 72. The remaining steps would be the same as that described above.

It should also be understood that the following elements of apparatus may be varied:
(1) the numbers of strands 76/guide structure 88;
(2) the number and orientation of the strands in chamber 68;
(3) the dimensions of heat vanes 94; and
(4) the number of partitions 104 used with inserter 102.

Also, the force employable by the low-pressure and high-pressure compressors may be varied. Presently, I plan to design high-pressure compressor 98 so that it will compress dry blend 10 with a pressure of approximately 2,000 p.s.i.

Those skilled in the art will also appreciate that the production rate of apparatus 50 may be varied as desired by varying, among other things, the length of chamber 68, the force of compressor 98, and the widths of the paths defined by adjacent heat vanes 94.

It should also be understood that members 80,80a could be used with apparatus that includes only one compression chamber. Such single-compression chamber apparatus would include elements like that described in connection with second compartment above. The only difference would be that amounts of dry blend 10 would be dropped directly from hopper 56 through port 74 and into entry section 72.

While the present invention has been shown and described with reference to the foregoing preferred embodiment, it will be apparent to those skilled in the art that other changes in form and detail may be made therein without departing from the spirit and scope of the invention as defined in the appended claims.

What is claimed is:

1. A method of heat/pressure-forming a thermoplastic composite comprising:
   selecting a quantity of first filler particles and a quantity of expanded thermoplastic pieces, with the pieces being usable as liquid adhesive material at elevated temperatures for bonding to filler particles;
   dry mixing at ambient temperature the particles and pieces to form a first blend, with the particles being dry mixed effectively with the pieces to suspend them for subsequent formation of the composite by heat/pressure; and
   heat/pressure-forming the first blend into a thermoplastic composite.

2. The method of claim 1 wherein the forming step includes forming the first blend into a non-foamed thermoplastic composite.

3. The method of claim 2 wherein the selecting step includes selecting filler particles from the group consisting of wood chips, cellulose, carbon, KEVLAR ® (polyaramid material) or glass fibers.

4. The method of claim 3 wherein the selecting step includes selecting waste thermoplastic.

5. The method of claim 4 wherein the selecting step includes selecting the thermoplastic from the group consisting of EPS, HDPE, or a combination of EPS and HDPE.

6. The method of claim 4 or 5 wherein the forming step includes the steps of placing a desired amount of the first blend into a chamber, compressing and heating the first blend therein to produce a molten thermoplastic composite, and dispensing the composite therefrom.

7. The method of claim 6 wherein the step of heating involves heated compressing.

8. The method of claim 7 further including the step of repeating the selecting step for a quantity of second particles and a quantity of pieces and repeating the dry-mixing step to form a second blend, and wherein the forming step includes partitioning the blends and placing desired amounts of the same into a chamber.

9. The method of claim 8 further including the step of tensioning plural strands of reinforcing fibers inside and longitudinally of the chamber so that the thermoplastic composite is formed with such fibers positioned therein.

10. The method of claim 1 wherein the dry-mixing step includes successively layering sections of woven fabric filler between pieces.

11. A thermoplastic composite formed by compressing and heated compressing in a chamber an ambient temperature blend of expanded thermoplastic pieces and up to 60% by weight filler particles being mixed effectively with the pieces to suspend them in the blend, thus to produce a molten thermoplastic composite, and dispensing the molten composite from the chamber.

12. The composite of claim 11 wherein the pieces are waste expanded thermoplastic.

13. The composite of claim 12 wherein the pieces are made of EPS.

14. The composite of claim 11, 12 or 13 wherein the filler particles are chosen from the group consisting of wood chips, cellulose, carbon, KEVLAR ® polyaramid material or glass fibers.

15. The composite of claim 14 wherein the filler particles have an outer dimension that is greater than ⅛ inch across.

16. The method of claim 6 wherein the compressing step involves a compressive pressure of approximately 2,000 p.s.i.

17. The composite of claim 11 wherein the compressing and heated compressing involves a compressive pressure of approximately 2,000 p.s.i.

* * * * *